(12) United States Patent
Favier

(10) Patent No.: US 8,327,655 B2
(45) Date of Patent: Dec. 11, 2012

(54) HEATING AND AIR-CONDITIONING INSTALLATION WITH A HEAT PUMP, THE INSTALLATION INCLUDING AT LEAST ONE HEAT TRANSFER FLUID DISTRIBUTOR UNIT WITH COUPLING TO A PLURALITY OF HEAT COLLECTION AND DELIVERY CIRCUITS

(75) Inventor: Georges Favier, Paris (FR)

(73) Assignee: Hades, Paris (FR)

( * ) Notice: Subject to any disclaimer, the term of this patent is extended or adjusted under 35 U.S.C. 154(b) by 395 days.

(21) Appl. No.: 12/677,080

(22) PCT Filed: Sep. 18, 2008

(86) PCT No.: PCT/FR2008/001304
§ 371 (c)(1),
(2), (4) Date: May 12, 2010

(87) PCT Pub. No.: WO2009/071765
PCT Pub. Date: Jun. 11, 2009

(65) Prior Publication Data
US 2010/0293982 A1 Nov. 25, 2010

(30) Foreign Application Priority Data
Sep. 21, 2007 (FR) .................................. 07 06611

(51) Int. Cl.
*F25B 27/00* (2006.01)
(52) U.S. Cl. ...................................... 62/238.7; 62/324.1
(58) Field of Classification Search ................. 62/238.7, 62/324.6, 160, 324.1, 126, 166, 178; 165/63, 165/201, 202
See application file for complete search history.

(56) References Cited

U.S. PATENT DOCUMENTS

| | | | |
|---|---|---|---|
| 6,634,183 B1* | 10/2003 | Jonsson et al. ................. | 62/476 |
| 8,127,566 B2* | 3/2012 | Hammond ....................... | 62/260 |
| 2002/0046569 A1* | 4/2002 | Faqih ............................... | 62/188 |
| 2002/0062953 A1* | 5/2002 | Demuth et al. ................ | 165/173 |
| 2003/0010509 A1* | 1/2003 | Hoffman ......................... | 169/56 |
| 2003/0111219 A1* | 6/2003 | Edwards ........................ | 165/208 |
| 2004/0045304 A1* | 3/2004 | Park ................................ | 62/183 |
| 2004/0065095 A1* | 4/2004 | Osborne et al. ................ | 62/160 |
| 2005/0103486 A1* | 5/2005 | Demuth et al. ............... | 165/174 |
| 2005/0237714 A1* | 10/2005 | Ebermann ...................... | 361/695 |
| 2006/0053832 A1* | 3/2006 | Ballet et al. ..................... | 62/503 |
| 2006/0196196 A1* | 9/2006 | Kates ............................... | 62/129 |
| 2006/0237164 A1* | 10/2006 | Bouchalat et al. .............. | 165/42 |

FOREIGN PATENT DOCUMENTS

| | | |
|---|---|---|
| DE | 32 45 416 A1 | 8/1984 |
| DE | 200 19 953 U1 | 3/2002 |
| DE | 202 14 086 U1 | 11/2002 |
| DE | 102 44 256 A1 | 4/2003 |
| DE | 102 45 572 A1 | 11/2003 |
| EP | 1 826 503 A2 | 8/2007 |
| EP | 1 826 503 A3 | 3/2008 |
| EP | 1 992 882 A1 | 11/2008 |

* cited by examiner

*Primary Examiner* — Mohammad Ali
(74) *Attorney, Agent, or Firm* — Haverstock & Owens LLP

(57) ABSTRACT

The distributor unit (10) is coupled to a heat pump (12) and to various circuits for collecting (24, 28, 30) and for delivering (38, 40, 52, 56) heat, with the unit serving to provide selective interconnection therebetween in application of various predetermined combinational schemes for fluid distribution by automatically controlling an integrated network of stop valves (200). The schemes define modes of operation such as natural cooling or freeze-proofing, producing hot water and/ or air conditioning from a single installation by optimizing transfers of heat between the circuits so that the heat pump is always operating in its thermodynamically optimum zone.

15 Claims, 5 Drawing Sheets

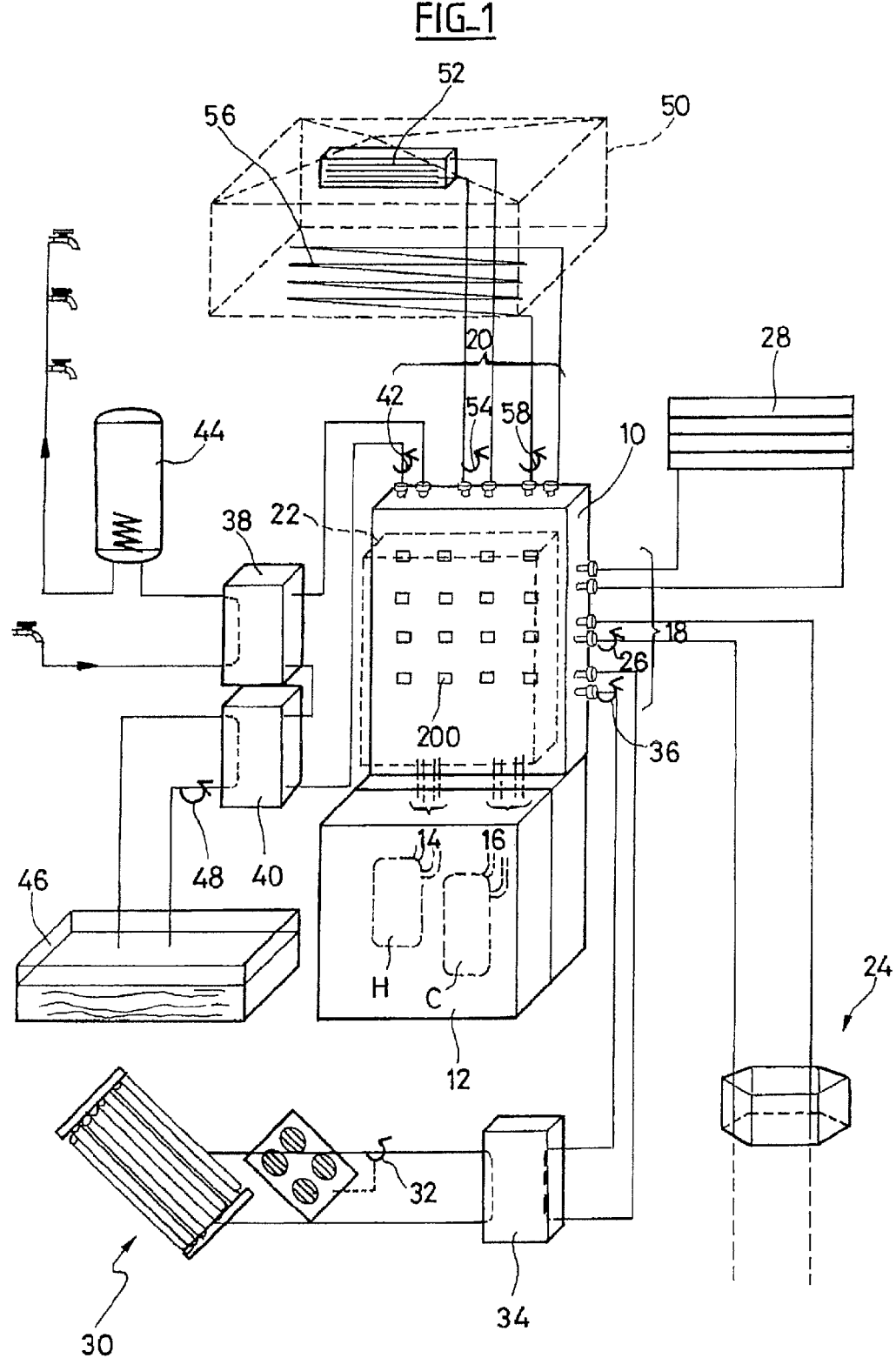
FIG_1

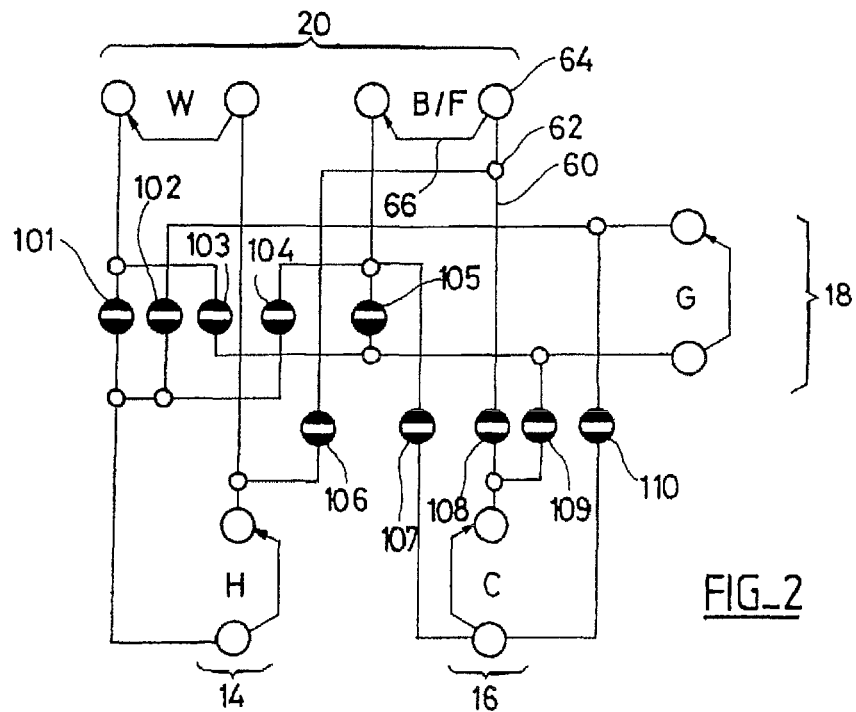
FIG_2
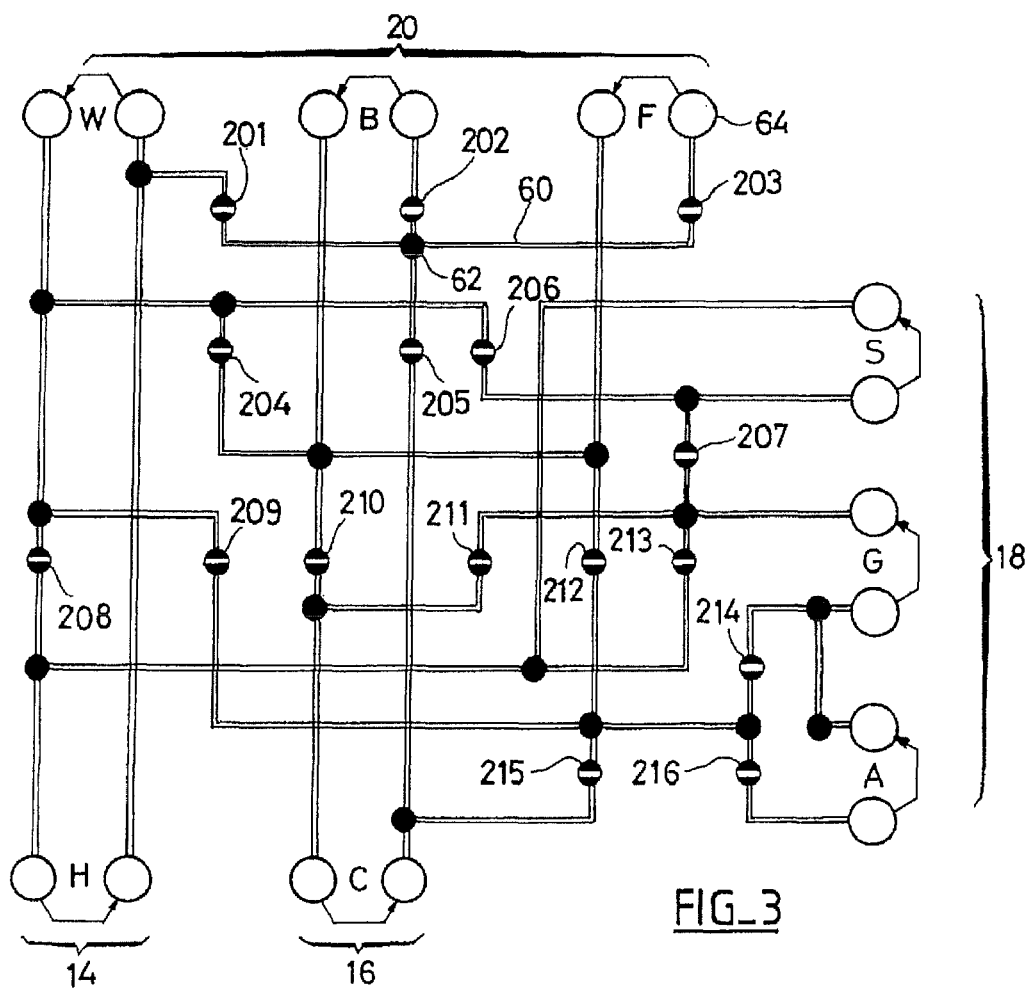
FIG_3

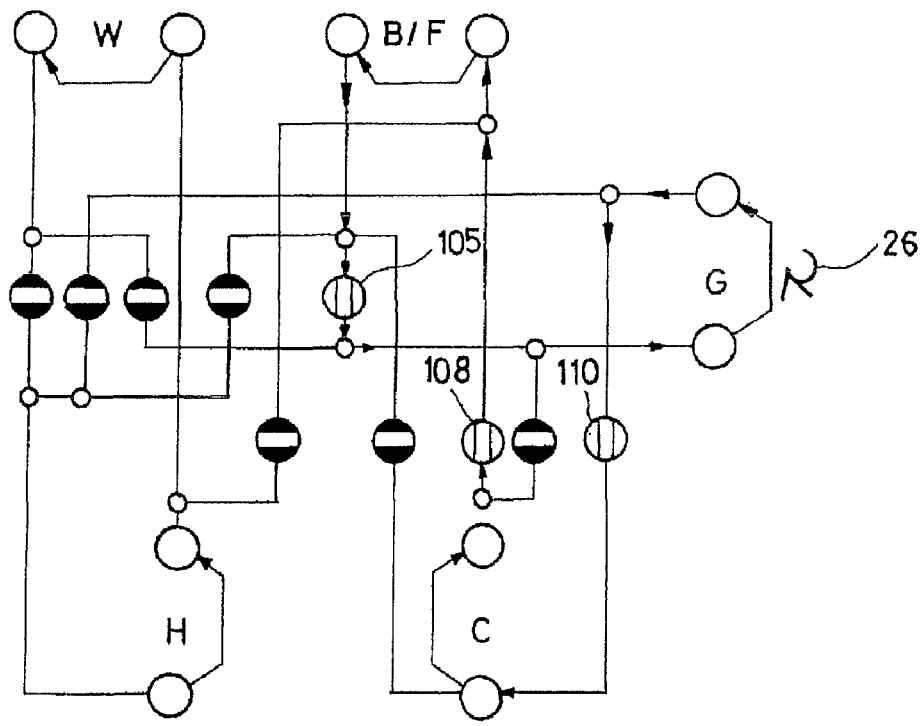
FIG_4
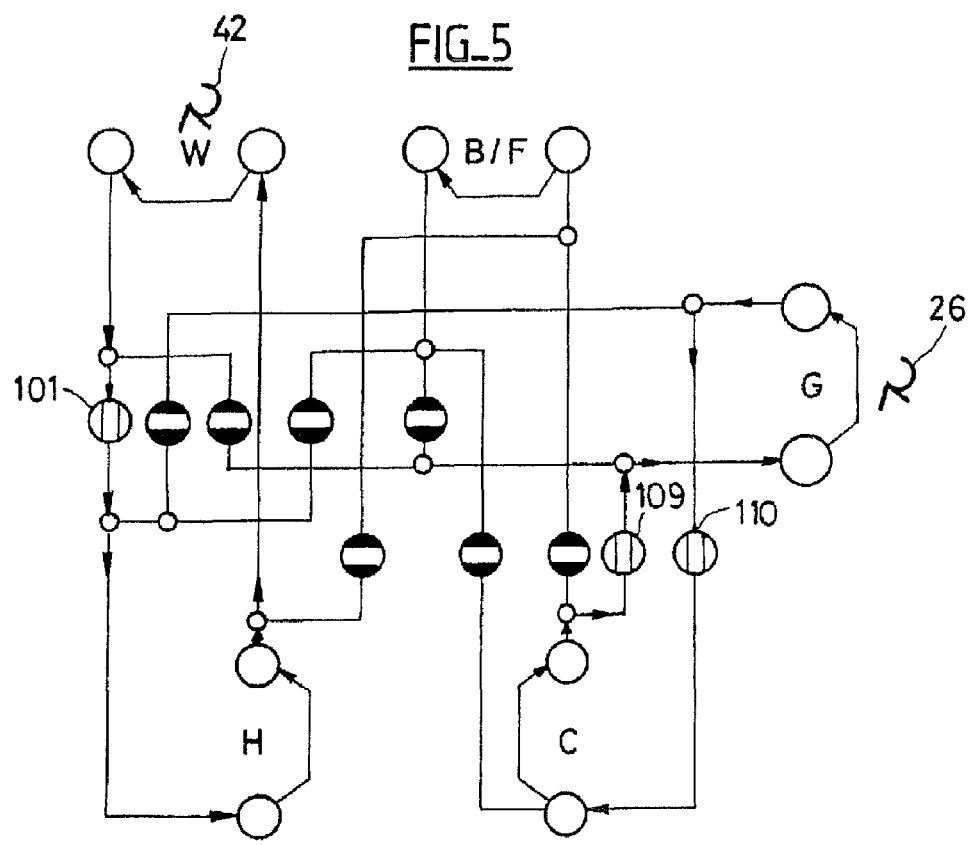
FIG_5

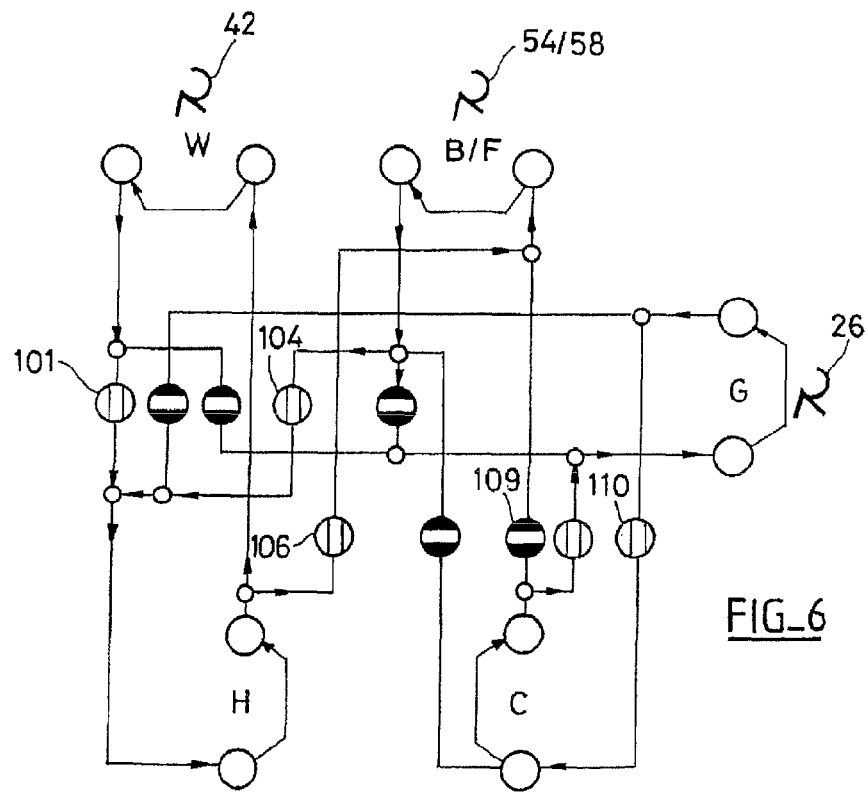
FIG_6
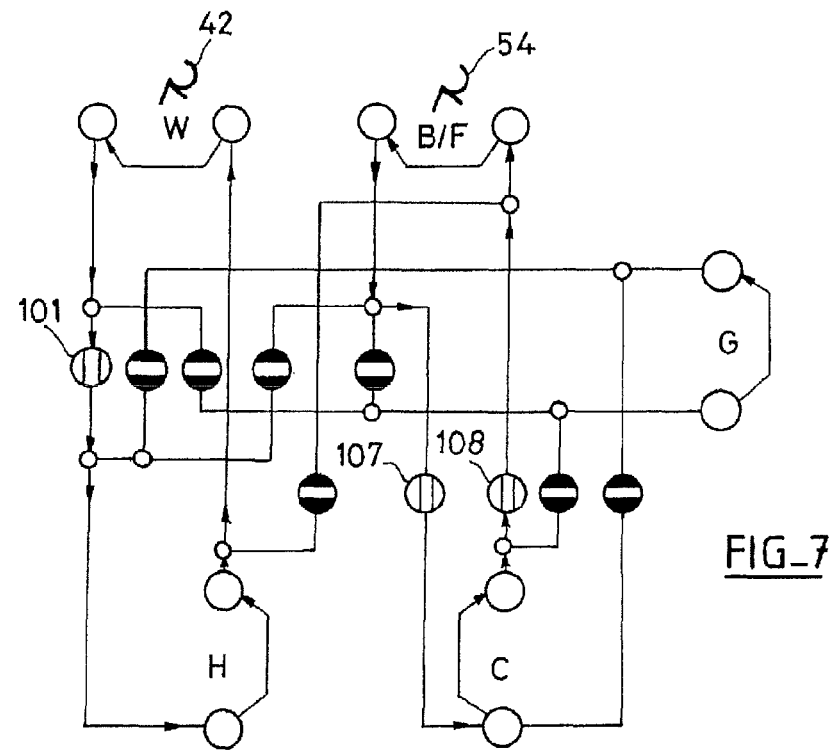
FIG_7

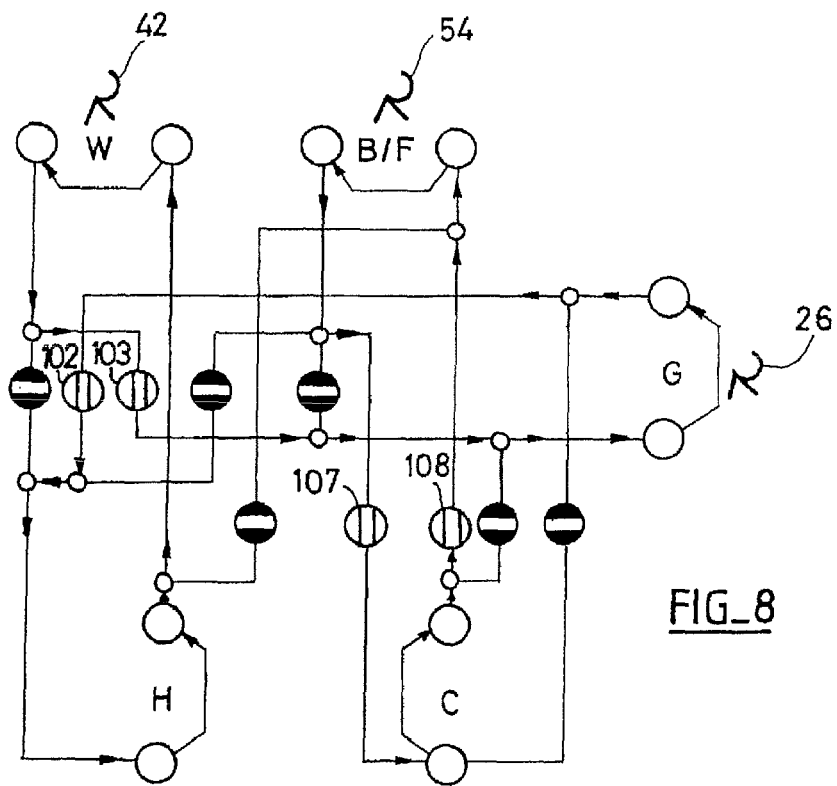
FIG_8
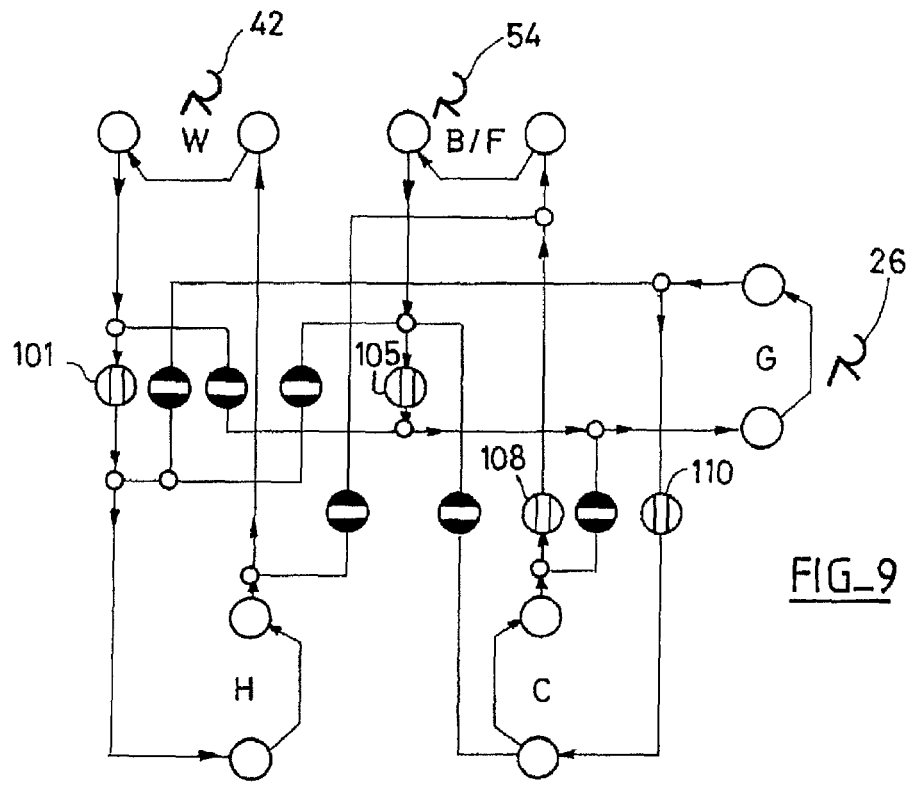
FIG_9

HEATING AND AIR-CONDITIONING INSTALLATION WITH A HEAT PUMP, THE INSTALLATION INCLUDING AT LEAST ONE HEAT TRANSFER FLUID DISTRIBUTOR UNIT WITH COUPLING TO A PLURALITY OF HEAT COLLECTION AND DELIVERY CIRCUITS

The invention relates to a heating and air-conditioning installation including a heat-transfer fluid distributor unit.

By way of example, one such installation is described in EP 1 826 503 A1, which discloses an installation comprising a unit for distributing heat-transfer fluid, the unit having a first and a second inlet/outlet for the heat-transfer fluid; at least one third inlet/outlet for the heat-transfer fluid suitable for being connected to a corresponding heat collector circuit; and at least one fourth inlet/outlet for the heat-transfer fluid that is suitable for being connected to a corresponding circuit for delivering heat. The unit also has distributor means suitable for selectively interconnecting the following in application of various predetermined combinational schemes for fluid distribution: the first inlet/outlet to at least one of the third and fourth inlet/outlets, and the second inlet/outlet to at least one of the third and fourth inlet/outlets. These distributor means comprise a network of interconnection pipes that are connected to one another and to the inlet/outlets, each of which pipes is provided with an individually-controllable stop valve. Control means control the various stop valves of the unit collectively so as to select one of said combinational schemes in modifiable manner.

The invention relates to applying such an installation, in particular by means of the distributor unit, to a situation in which the heating and air-conditioning source is a heat pump.

Various heat-pump installations are described, e.g. in DE 102 45 572 A1, DE 32 45 416 A1, or DE 32 45 416 A1. Nevertheless, those are installations that are not specific to heat pumps, in which the heat pump is merely one source of heat selected from amongst other possible sources.

The present invention seeks to solve a certain number of difficulties that are inherent to heat pump installations, which present special features as described below.

A heat pump serves to collect the available heat energy from the upper layers of the earth's crust, to concentrate this energy to a higher temperature, and to deliver it in this concentrated form in order to feed a heating circuit. Certain models in which heat exchangers can be permutated are known as being "reversible", and they also enable an air conditioning circuit to be operated, with the ambient heat energy from the premises then being delivered to the subsoil.

Essentially, a heat pump comprises a refrigerant fluid circuit with a compressor, an expander, an evaporator, and a condenser, together with two associated heat exchangers. The first heat exchanger is coupled on its primary side to the evaporator and on its secondary side to a heat collector circuit, while the second heat exchanger is coupled on its primary side to the condenser and on its secondary side to a heat delivery circuit (these two heat exchangers correspond respectively to that which is referred to below as the "cold side" and the "hot side" of the heat pump).

In the heating configuration, the compressor of the heat pump concentrates the energy collected from the ground (collector circuit) at the condenser side and delivers the energy for use in heating (delivery circuit) at the evaporator side.

The term "heat delivery" should be understood broadly, i.e. it covers not only circumstances in which heat proper is delivered (e.g. for use in domestic heating or producing hot water), but also circumstances in which the temperature of premises is to be lowered, where "delivery" consists in providing an air conditioning or cooling function, with the excess heat energy then being transferred to the "collector" circuit by the heat pump.

With heat pumps of the "water/water" type, to which the invention applies, the collector circuit and the delivery circuit are both circuits in which a liquid flows, which liquid is referred to herein as the "heat-transfer fluid". Naturally, depending on requirements, water could be replaced by or associated with some other liquid. In particular, in order to be able to flow in the heat collector circuit, ethylene glycol or some other additive that performs an antifreeze function is often added to the water.

At the cold side of the heat pump, the heat-transfer fluid is admitted at a temperature of about 5° C. to 20° C., and it is delivered at the outlet therefrom at a temperature that is about 3° C. to 5° C. lower; at the hot side, the heat exchanger of the heat pump receives the fluid at a temperature that is typically of the order of 30° C. to 60° C., and it is delivered at the outlet therefrom at a temperature that is 3° C. to 5° C. higher.

The compressor, its associated refrigerant fluid circuit, and the two heat exchangers are grouped together in a common functional block, referred to below as the "heat pump core", which constitutes an integrated assembly for being associated with or connected to the various elements of the heat collection or delivery circuits (pipework, circulator pump, thermostatic sensor, etc.), and also power supply and regulator equipment for the system.

WO-A-2006/005832 (Favier et al.) describes one such water/water type heat pump implemented in the form of a compact pump core.

The present invention lies more particularly in the equipment for connecting such a pump core to the heat energy collector and delivery circuits.

Concerning the heat collector circuits, the main type of collection is collecting heat energy stored in the immediate subsoil, earth or rock, or indeed from water tables and natural springs, at a temperature that remains substantially constant throughout the year, and is about 10° C. in temperate regions. The heat-transfer fluid, after being cooled by the evaporator of the heat pump, is delivered to a "buried collector probe" such as that described for example in WO-A-2006/111655 (Hadès). The fluid is then heated on coming into contact with the surrounding medium which delivers heat energy thereto: each linear meter of the probe embedded in the corresponding surrounding medium is thus capable of delivering several joules of heat energy to the heat pump when the circuit is in operation. The heated fluid returns to the heat pump which concentrates and delivers the heat energy as collected in this way.

Nevertheless, this type of collection is not the only type available: it is also possible, in addition, to collect atmospheric heat energy and/or solar heat energy that is delivered by radiation. In practice atmospheric or solar collection is difficult to implement, in particular because of the large variations presented by outside temperature and solar radiation as a function of latitude, season, and time of day (in particular between day and night). These variations, and the fact that it is specifically for the purpose of combating the effects of these changes that it is desirable to heat or air condition a premises, mean that direct use thereof in home applications has, until now, been found to be unsatisfactory.

When it comes to heat delivery circuits, home uses of heat energy can be subdivided into three main categories.

The first category is low temperature heating of premises via low temperature radiators or via a heating floor. To diffuse heat, such a system requires a heat-transfer fluid to be circulated at a temperature of about 30° C. to 45° C. To provide protection against freezing, and providing the premises are well insulated, the system may be used to circulate a fluid at a lower temperature, e.g. about 10° C. Finally, in hot weather, the system may be used for cooling the premises by being fed with a fluid that is delivered at a low temperature, close to 10° C.

The second category of utilizations is heating (or cooling air) by means of fan-coils, or heating by high-temperature radiators. In winter, for heating domestic premises, such systems require a fluid to be circulated at a temperature of the order of 45° C. to 65° C. In summer, for providing air conditioning, the fluid needs to be at low temperature, about 5° C. to 15° C.

The third category of utilizations is heating water for domestic purposes. This may involve producing domestic hot water (or at least preheating it), or indeed heating or preheating water for feeding to domestic appliances such as a washing machine or a dishwasher (so as to avoid an electrical resistance element providing all of the heating), or indeed heating swimming pools or whirlpool baths. In this category of applications, in particular for domestic hot water, it may be desirable for water to be available at a temperature of about 65° C. in order to avoid using a topping-up electrical resistance element if the temperature is not sufficient.

Those various circuits for collecting and delivering heat may be combined in various ways.

In its traditional configuration, its simplest configuration, a heat pump is used for feeding a heating circuit, with energy being collected from the subsoil.

It is also possible to make the heat pump operate in reverse, i.e. to drive an air conditioning system. Excess heat is then stored in the subsoil.

Proposals have been made to use the same heat pump in one or other of those two configurations depending on requirements and the season. Such heat pumps are said to be "reversible", and they generally operate by interchanging the heat exchangers of the heat generator (cold side/hot side) by means of a three-port valve.

Nevertheless, the effectiveness of such reversible heat pumps is limited by the fact that changing the configuration gives rise to a major modification to the heat balance within the heat pump, due to the heat exchangers not being specialized (since they need to be capable of being interchanged).

In any event, even with heat pumps dedicated to the heating function only, thermal needs may vary to a very wide extent, e.g. depending on whether it is desired to produce domestic hot water, or to provide heating by means of fan-coils, or to provide low temperature heating (floor heating). The heat balance is very different for each function, so it is not possible to set the operation of the heat pump at an optimum corresponding to each of those modes of operation, particularly when they need to be capable of being used separately or in parallel, depending on the installation and on the season.

On the same lines, it is mentioned above that it is possible to use atmospheric or solar collection. However the operating conditions for those kinds of collection vary enormously as a function of the time of day, the season, the climate, . . . , unlike collecting heat from the subsoil where temperature remains practically constant all the year round. At present, this extreme variability means that atmospheric or solar collection is in practice used very little, in spite of the large potential for heat exchange that they represent when good ambient conditions are present.

The object of the invention is to remedy the various limitations mentioned above.

An object of the invention is to provide an installation designed around a water/water heat pump with a distributor unit enabling multiple utilizations to be performed (a plurality of delivery circuits connected to the same unit), and suitable for operating in various different modes (e.g. heating and air-conditioning).

A particular object of the invention is to optimize the heat balance, and thus the efficiency of the heat exchanger, by adapting the flow of the heat-transfer fluid in the various circuits as a function: i) of the selected mode of operation; and ii) of the corresponding heat balance, at any given instant.

In particular, e.g. when operating in both heating and air-conditioning modes, and as explained below, switching from one mode to the other is performed without interchanging the heat exchangers within the heat generator of the heat pump, unlike what is presently performed using reversible heat pumps.

As a result, the heat exchangers of the thermal module of the heat pump remain heat exchangers that are specialized, being designed to operate in given respective operating temperature ranges.

In general, and in particular when a plurality of collector circuits are available (atmospheric collection and solar collection in addition to subsoil collection), another object of the invention is to optimize the energy balance of the equipment by controlling the distribution of fluid within the various collection circuits as a function of circumstances, and in particular as a function of the temperature of the fluid. As explained below, this is achieved by favoring circuits where the temperature is optimal in terms of the availability or the production of heat energy, and then in redistributing the fluid at the most appropriate temperature for the required domestic purpose, while making the largest possible use of renewable natural energy sources.

Thus, the heat energy conveyed by the heat-transfer fluid may be used either as is (at the temperature at which it is provided by the selected collector circuit), or after being transformed by the appropriate heating/cooling system that has on one side a concentrator (i.e. for raising to a higher temperature) and on the other side a cooler (i.e. for lowering to a lower temperature), with the heat pump core always operating under the best conditions for its thermodynamic performance.

From a technological point of view, the object of the invention is to make available a distributor system that is in the form of a single compact unit housing all of the elements required and interfaced firstly with the heat pump core and secondly with the delivery and collection circuits.

Grouping the members together in this way in a common unit presents several advantages, and in particular:

the unit is of small size, compatible with a domestic heat pump;

it is possible to use a thermal module without any three-port valve, while nevertheless retaining the possibility of reversing the operation thereof;

the unit may be produced industrially in a factory, thereby achieving significant reductions in production costs compared with an installation performed on site, where a technician needs to assemble together in more or less empirical manner a multiplicity of tubes, valves, and control circuits;

the unit may be installed very quickly and connected to the heat collector and delivery circuits of the installation; it can be removed for revision or repair, and it can be replaced by substituting another unit, should that be necessary; and all of the tubes and members of the distributor may easily be embedded in a thermally insulating foam that is injected into the unit, thereby having the effect of lagging all of the connecting tubes in a single operation that is easily industrialized and therefore inexpensive, unlike lagging that is applied on site by installers in empirical manner.

To this end, the invention proposes a heating and air-conditioning installation of the same general type as that disclosed in above-mentioned EP 1 826 503 A1, the installation being characterized in that:

it includes a water/water type heat pump with a hot-side heat exchanger and a cold-side heat exchanger in which said heat-transfer fluid flows, said heat-transfer fluid being common to the hot-side heat exchanger of the heat pump, to the cold-side heat exchanger of the heat pump, to the heat collector circuit, and to the heat delivery circuit; and the distributor unit is connected to the hot-side heat exchanger via the first heat-transfer fluid inlet/outlet, and to the cold-side heat exchanger via the second heat-transfer fluid inlet/outlet.

Here and below, the term "inlet/outlet" covers an orifice through which the heat-transfer fluid passes, either towards the inside of the distributor unit ("inlet") or conversely towards the outside of the same unit ("outlet"). For convenience, all of the orifices of the distributor unit are referred to as "inlet/outlets", even though some of them operate only as inlets, others operate only as outlets, and still others operate either as inlets or as outlets depending on the fluid flow direction, which flow direction is itself a function of the particular combinational distribution scheme that is selected.

The predetermined combinational schemes for distributing fluid are schemes defining modes of operation belonging to the group formed by:

natural cooling or freeze-proofing;

producing hot water by the hot-side heat exchanger of the heat pump, with heat being collected by the cold-side heat exchanger of the heat pump;

producing hot water and heating by the hot-side heat exchanger of the heat pump, with heat being collected by the cold-side heat exchanger of the heat pump;

producing hot water by the hot-side heat exchanger of the heat pump and air conditioning by the cold-side heat exchanger of the heat pump;

producing hot water by the hot-side heat exchanger of the heat pump and air conditioning by the cold-side heat exchanger of the heat pump with transfer of the excess heat produced to the heat collector circuit; and producing hot water by the hot-side heat exchanger of the heat pump and air conditioning by the cold-side heat exchanger of the heat pump with the excess heat delivered being transferred from the heat collector circuit.

Most advantageously, the distributor unit comprises a closed cabinet housing the distributor means and presenting dimensions that are no greater than 30 centimeters (cm)×55 cm×70 cm not including the control means, or 55 cm×55 cm×70 cm including the control means; the cabinet may also be filled with a thermally insulating material for lagging the pipes and the valves.

Advantageously, the total number of said stop valves is equal to the total number of inlets and outlets of said first, second, third, and fourth heat-transfer fluid inlet/outlets: for example ten stop valves for a unit having a single third fluid inlet/outlet, or sixteen stop valves for a unit having three third fluid inlet/outlets and three fourth inlet/outlets.

According to various subsidiary advantageous characteristics:

the distributor means do not include any multi-port distribution valve;

the stop valves are electrically controlled on/off type valves;

said heat collector circuit(s) is/are taken from the group formed by: subsoil heat energy collector circuits; atmospheric heat energy collector circuits; and solar energy collector circuits; and said heat delivery circuit(s) is/are taken from the group formed by: heating and air-conditioning circuits using fan-coils; heating circuits high temperature radiators; heating/low temperature cooling circuits; circuits for producing hot water; and water preheating circuits.

Furthermore, for a given mode of operation, the distributor means advantageously are suitable for selecting a heat collector circuit from a plurality of said circuits.

They may also be suitable for operating as a function of the selected operating mode to cause at least one fluid circulation pump to be put into operation that is associated with one of the fluid collector or delivery circuits.

Under such circumstances, the connections between the first fluid inlet/outlet and the hot-side heat exchanger of the heat pump, and between the second fluid inlet/outlet and the cold-side heat exchanger of the heat pump are direct connections without any circulator pump.

Finally, the control means may also be suitable, as a function of the selected mode of operation, for controlling the running or the stopping of the compressor of the heat pump.

There follows a description of an embodiment of the installation of the invention given with reference to the accompanying drawings in which the same numerical references are used from one figure to another to designate elements that are identical or functionally similar.

FIG. 1 is a diagram of a complete heating and air-conditioning installation with a heat pump, making use of a specific distributor unit of the invention.

FIG. 2 shows a first embodiment of a specific distributor unit of the invention for coupling a heat pump to two delivery circuits and to one collector circuit.

FIG. 3 shows a second embodiment of the specific distributor unit of the invention that is more complete, for coupling a heat pump to three collector circuits and to three delivery circuits, as in the installation shown diagrammatically in FIG. 1.

FIGS. 4 to 9 show various interconnection schemes that can be obtained by selectively operating the valves of the FIG. 2 distributor unit.

FIG. 1 shows a heating and air-conditioning installation of the invention with a specific distributor unit 10 associated with a heat pump.

On a first side, the distributor unit 10 is coupled to a heat pump core 12, of a type such as that described for example in WO-A-2006/005832 (Favier et al.) to which reference may be made for more ample details. Essentially, the heat pump core behaves like a thermodynamic system having a hot side and a cold side. The cold side receives a heat-transfer fluid at a temperature lying in the range 7° C. to 15° C., and it delivers it at a temperature that is 3° C. to 5° C. lower. The hot side receives a heat-transfer fluid at a temperature lying in the range 30° C. to 32° C. (60° C. to 62° C. in high-temperature models), and it delivers this fluid at a temperature that is 3° C. to 5° C. higher. The unit 10 has a first inlet/outlet 14 for heat-transfer fluid connected to the hot-side heat exchanger (referenced H) of the pump core 12, and a second inlet/outlet 16 for heat-transfer fluid connected to the cold-side heat exchanger (referenced C) of the same pump core 12. The connections between the inlet/outlets 14, 16 and the hot- and cold-side heat exchangers of the heat pump are preferably direct connections, without any circulation pumps.

On the other side, the unit 10 is connected via a series of inlet/outlets 18 to one or more heat collector circuits and via a series of inlet/outlets 20 to one or more heat delivery circuits.

Control means are also provided that are referenced 22 and that enable the various internal members of the unit 10 to be controlled selectively in the manner explained below as a function of user requirements and of possibilities for optimizing the heat balance. These control means may be incorporated in the unit proper, or they may be associated therewith, i.e. placed beside the unit or against the unit while being functionally coupled thereto.

Heat Collector Circuits

There follows a description of the heat collector circuits that are suitable for coupling to the unit 10 via the various inlet/outlets 18.

The installation has a collector circuit 24 for collecting heat from the subsoil, which circuit comprises a suitable set of tubes referred to as "collector probes"that are buried in the upper layers of the ground, in the manner described in WO-A-2006/111655 (Hadès), to which reference may be made for further details. The flow of the heat-transfer fluid in this subsoil collector circuit 24 is driven by a pump 26. The fluid leaves the unit 10 at a given temperature, exchanges its heat energy with the temperature of the ground, and returns to the unit at said new temperature, which is then used in the manner described below.

In the installation shown in FIG. 1, the heat-transfer fluid may also be sent by the unit 10 to an atmospheric collector circuit 28, the fluid then returning to the unit at a temperature close to the atmospheric temperature at that time. The atmospheric collector heat exchanger 28 may be a static heat exchanger (and thus completely silent and of discreet appearance) or it may be a forced circulation heat exchanger provided with a fan. There is no need to provide a circulator pump specifically for the atmospheric collector circuit 28 insofar as it is used in principle in series with subsoil energy collection 24, and only under certain circumstances, e.g. a configuration for cooling the dwelling while simultaneously producing hot water, this happening with excess heat.

The heat-transfer fluid may also be sent by the unit 10 to a solar energy collector circuit 30 that includes a solar collector facing in an appropriate direction. The water heated by this collector is circulated by a pump 32 and then passes through a heat exchanger 34 coupled to the unit 10 via a flow loop for the heat-transfer fluid that is driven by a pump 36. The fluid heated by the solar collector may be used in the heat delivery circuit and also, where necessary or desirable, in the network of subsoil energy collector tubes, if it is desired to use it as a "temporary reserve" for receiving excess collected solar energy in order to deliver it subsequently. This mode of operation may be selected in particular for protecting the dwelling against freezing, or for contributing to additional energy saving by raising the temperature of the cold source used by the heat pump, thereby correspondingly increasing the performance thereof with a corresponding reduction in electricity consumption.

Heat Delivery Circuits

There follows a description of the circuits for delivering heat that are suitable for coupling to the unit 10 via the various inlet/outlets 20.

The first type of circuit is a circuit for producing hot water and comprises, in the example shown, two heat exchangers 38 and 40 that are fed with heat-transfer fluid by a circulator pump 42.

The heat exchanger 38 preheats the domestic hot water stored in a hot water tank 44. When this preheating is insufficient, an electrical resistance element incorporated in the tank 44 provides additional heating. The other heat exchanger 40 is used for heating the water of a swimming pool 46 or of some other analogous equipment (a whirlpool bath, etc.) with water being taken to the heat exchanger 40 by a circulator pump 48.

A second type of circuit for delivering heat in the installation shown in FIG. 1 is for heating or cooling a premises 50. It is constituted by fan-coils 52 each comprising a heat exchanger and a system enabling hot or cold air to be diffused into the premises by the forced draught passing through the heat exchanger, and depending on the function that has been selected (heating or cooling). The heat-transfer fluid passing through the heat exchanger is circulated by a pump 54 feeding the various fan-coils 52 of the installation.

When heating, the heat energy may come either from the solar collector 30 or from the hot side H of the heat pump core 12. When cooling, the low temperature heat-transfer fluid may come from the cold side C of the heat pump core 12 and/or from the subsoil, from the collector circuit 24. This configuration corresponds to the cooling principle known as "free cooling" or "Canadian air conditioning" or "Provengale air conditioning", which technique consists in cooling the air in a premises by circulating it through the subsoil, which, particularly in summer, remains at a temperature that is well below the ambient outside temperature.

There is also shown a third type of circuit for delivering heat, constituted by a heating floor 56 or by low temperature radiators in which the heat-transfer fluid is set into circulation by means of a pump 58.

The heat diffused in the premises 50 via the heating floor 56 or the low temperature radiators may come from the hot side H of the heat pump core 12 or directly from the solar collector 30, or indeed from the subsoil collector 24, where the subsoil collector is used more specifically for preventing the installation from freezing.

Internal Structure of the Distributor Unit

FIGS. 2 and 3 show two different embodiments of the configuration of the various internal members of the unit 10.

FIG. 2 corresponds to a unit enabling the heat pump to be coupled to two delivery circuits and to one collector circuit, while FIG. 3 corresponds to a unit that is more complete, enabling the heat pump to be connected to three collector circuits and to three delivery circuits (as in the installation described above with reference to FIG. 1).

In these figures, the various circuits are labeled as follows:
hot side H: the side connected to the heat exchanger on the hot side of the heat pump 12 via the inlet/outlets 14;
cold side C: the side connected to the cold-side heat exchanger of the heat pump 12 via the inlet/outlets 16;
ground circuit G: the collector circuit for collecting heat energy from the subsoil (circuit 24 in FIG. 1);
atmospheric circuit A: the circuit for collecting atmospheric heat energy (circuit 28 in FIG. 1);
solar circuit S: the circuit for collecting solar thermal energy (circuit 30 in FIG. 1);
water circuit W: the circuit for producing hot water, including domestic hot water and/or water heating;
blower circuit B: the circuit for heating/cooling by blowing via the fan-coils;

floor circuit F: the circuit for heating via the floor or via low temperature radiators; and blower/floor circuit B/F: a circuit that can be used equally well as a circuit B or a circuit F.

The distributor unit of the invention is constituted by a series of tubes such as 60 made of plastics material or metal that are interconnected either via unchanging branch connections such as 62 or via stop valves (on/off two-port valves) such as 101 . . . 110 (FIG. 2) or 201 . . . 216 (FIG. 3). The valves may advantageously be metal valves with respective spherical plugs that are electrically controlled and that return information about their positions, or they may be valves of any other type, even including manually-operated valves of plastics material in a simplified version of the unit of the invention.

The network of interconnected tubes opens out to couplings such as 64 for connection firstly to the heat pump (inlet/outlets 14 and 16), and secondly to the collector circuits (inlet/outlets 18) and to the delivery circuit (inlet/outlets 20). Arrows such as 66 connecting the coupling points 64 show the flow direction of the fluid outside the distributor unit of the invention in the heat exchangers of the heat pump or in the various collector or delivery circuits.

Because the heat-transfer fluid may follow a variety of different circuits within the unit, it should be observed that it is essential for the same fluid to be selected for use in all of the collector circuits and the heat delivery circuits.

Control of the valves is advantageously automated by means of a suitable programmer serving to control the various valves collectively in order to select various combinational schemes for distributing fluid between the inlet/outlets 14, 16, 18, and 20 in a manner that is modifiable.

The control program takes account of conditions of use, the capacity of the heat pump core, the needs of the user, external conditions (temperature, sunlight), etc. It should be observed that the requirements for heat delivery may vary greatly depending on the climate, the location of the building, the preferences of the user, . . . . The very low costs of mass-producing the unit of the invention on an industrial scale make it possible to envisage producing units that correspond to different uses, each corresponding to operating only some of the flow circuits amongst all of those that are theoretically possible, as described below.

Combinational Schemes for Distributing the Heat-Transfer Fluid

There follows a description with reference to FIGS. 4 to 10 of the various combinational schemes for distributing fluid that can be implemented with the particular configuration of tubes 60, branch connections 62, and valves 101 . . . 110 of the first embodiment shown in FIG. 2. This embodiment corresponds to a simplified unit that does not make use of atmospheric collection nor of solar collection, and does not provide for separate delivery circuits for fan-coils and ground heating (i.e. it is possible to use one or the other of those modes of delivery, but not both simultaneously).

This simplification makes it possible to reduce the total number of valves to ten valves 101 . . . 110 and to achieve a corresponding simplification of the control of these various valves, thus making it possible to propose a unit that is of lower cost while nevertheless being suitable for satisfying a very large majority of usual needs.

FIG. 4: open valves 105, 108, and 110; switch on pump 26 of circuit G; stop the compressor of the heat pump.

This configuration corresponds to minimum operation of the installation, freeze-proofing or freeze cooling. Since the heat pump is off, the only energy consumed is that consumed by the circulator pump 26.

FIG. 5: open valves 101, 109, and 110; switch on the pumps 26 and 42 of the circuits G and W, respectively; heat pump compressor in operation.

This configuration corresponds to producing hot water (circuit W) via the hot side (H) of the heat pump, with the subsoil heat collector (circuit G) being connected to the cold side (C) of the heat pump.

FIG. 6: open valves 101, 104, 106, 109, and 110; switch on pumps 26, 42, 54 (or 58) of the circuits G, W, and B (or F), respectively; heat pump compressor in operation.

This configuration corresponds to producing hot water (circuit W) and heating (circuit B/F) via the hot side H of the compressor. The subsoil heat collection (circuit G) is connected to the cold side (C) of the heat pump.

FIG. 7: open valves 101, 107, and 108; switch on pumps 42 and 54 of the circuits W and B/F, respectively; heat pump compressor in operation.

This configuration corresponds to cooling air by the fan-coils (circuit B/F) from the cold side (C) of the heat pump, while simultaneously producing hot water (circuit W) via the hot side (H) of the heat pump, with the thermal balance presenting neither excess cold nor excess heat.

FIG. 8: open the valves 102, 103, 107, 108; switch on the pumps 26, 42, and 54 of the circuits G, W, and B/F, respectively; heat pump compressor in operation.

This configuration corresponds to the same functions as for FIG. 7, but in a situation where the heat balance causes excess heat to appear, which is then sent to the subsoil collection.

FIG. 9: open valves 101, 105, 108, and 110; switch on pumps 26, 42, and 54 of the circuits G, W, and B/F, respectively: heat pump compressor in operation.

This configuration corresponds to the same functions as those of FIG. 7, but in a situation where the heat balance gives rise to excess cold, which cold is then sent to the subsoil collection.

When the unit has sixteen valves as shown in FIG. 3, it may be operated in analogous manner for selectively operating the various valves 201 . . . 216 to perform the following functions:

a) freeze-proofing or free cooling: open the valves 203, 205, 211, 212, and 214; switch on the pumps of the circuits F and G; compressor off;

b) heating the circuits W, B, F, and G by the solar collector S: open the valves 201, 202, 203, 204, 207, 212, and 214; switch on the pumps of the circuits W, B, F, S, and G; compressor off;

c) heating circuit W from the solar collector S, with free cooling in parallel (circuit F) using subsoil collection (circuit G): open valves 203, 205, 206, 211, 212, and 214; switch on the pumps of circuits W, F, S, and G; compressor off;

d) heating circuits W, B, and F from the hot side H of the pump, coupling the cold side C to the circuit G: open the valves 201, 202, 203, 204, 208, 211, 214, and 215; switch on the pumps of the circuits W, B, F, and G; compressor on;

e) heat circuit W from the hot side H while simultaneously cooling circuit B from the cold side C, without any excess heat or cold: open the valves 202, 205, 208, and 210; switch on the pumps of the circuits W and B; compressor on;

f) as in e), with excess cold being sent to the subsoil (circuit G); open valves 202, 205, 208, 211, 212, and 214; activate the pumps of the circuits W, B, and G; compressor on; and g) as in e), with excess heat being sent to atmospheric collection (circuit A) and to subsoil collection (circuit G): open valves 202, 205, 209, 210, 213, and 216; switch on the pumps of circuits W, B, and G; compressor on.

The invention claimed is:

1. A heating and air-conditioning installation with a heat-transfer fluid and including a heat-transfer fluid distributor unit, the unit comprising: first and second inlet/outlets for the heat-transfer fluid; at least one third inlet/outlet for the heat-transfer fluid and suitable for being connected to a corresponding circuit for collecting heat; at least one fourth inlet/outlet for the heat-transfer fluid, suitable for being connected to a corresponding circuit for delivering heat; distributor means suitable for selectively interconnecting in various different predetermined fluid distribution combinational schemes: the first inlet/outlet to at least one of the third and fourth inlet/outlets, and the second inlet/outlet to at least one of the third and fourth inlet/outlets, the distributor means comprising a network of interconnection pipes connected to one another and connected to the inlet/outlets and each provided with an individually controllable stop valve; and control means for collectively controlling the various stop valves of the unit so as to select any one of said combinational schemes in modifiable manner; the installation includes a water/water type heat pump with a hot-side heat exchanger and a cold-side heat exchanger said heat-transfer fluid flows, said heat-transfer fluid being common to the hot-side heat exchanger of the heat pump, to the cold-side heat exchanger of the heat pump, to the heat collector circuit, and to the heat delivery circuit; and the distributor unit is connected to the hot-side heat exchanger via the first heat-transfer fluid inlet/outlet, and to the cold-side heat exchanger via the second heat-transfer fluid inlet/outlet.

2. The installation of claim 1, wherein said predetermined combinational schemes for distributing fluid are schemes defining modes of operations belonging to the group formed by: natural cooling or freeze-proofing; producing hot water by the hot-side heat exchanger of the heat pump, with heat being collected by the cold-side heat exchanger of the heat pump; producing hot water and heating by the hot-side heat exchanger of the heat pump, with heat being collected by the cold-side heat exchanger of the heat pump; producing hot water by the hot-side heat exchanger of the heat pump and air conditioning by the cold-side heat exchanger of the heat pump; producing hot water by the hot-side heat exchanger of the heat pump and air conditioning by the cold-side heat exchanger of the heat pump with transfer of the excess heat produced to the heat collector circuit; and producing hot water by the hot-side heat exchanger of the heat pump and air conditioning by the cold-side heat exchanger of the heat pump with the excess heat delivered being transferred from the heat collector circuit.

3. The installation of claim 1, wherein the distributor unit comprises a closed cabinet housing the distributor means and presenting dimensions no greater than 30 cm.times.55 cm.times.70 cm not including the control means, or 55 cm.times.55 cm.times.70 cm including the control means.

4. The installation of claim 1, wherein the distributor unit comprises a closed cabinet housing the distributor means and filled with a thermally insulating material lagging the pipes and the valves.

5. The installation of claim 1, wherein the total number of said stop valves is equal to the total number of inlets and outlets of said first, second, third, and fourth heat-transfer fluid inlet/outlets.

6. The installation of claim 5, wherein the distributor unit comprises a single third fluid inlet/outlet (G), two fourth inlet/outlets (W, B/F), and ten stop valves (101-110).

7. The installation of claim 5, wherein the distributor unit comprises three third fluid inlet/outlets, three fourth inlet/outlets, and sixteen stop valves.

8. The installation of claim 1, wherein the distributor means do not include any multi-port distribution valve.

9. The installation of claim 1, wherein the stop valves are electrically controlled on/off type valves.

10. The installation of claim 1, wherein said heat collector circuit(s) is/are taken from the group formed by: subsoil heat energy collector circuits; atmospheric heat energy collector circuits; and solar energy collector circuits.

11. The installation of claim 1, wherein said heat delivery circuit(s) is/are taken from the group formed by: heating and air-conditioning circuits using fan-coils; heating circuits high temperature radiators; heating/low temperature cooling circuits; circuits for producing hot water; and water preheating circuits.

12. The installation of claim 1, wherein, for a given mode of operation, the distributor means are suitable for selecting a heat collector circuit from a plurality of said circuits.

13. The installation of claim 1, further comprising at least one circulator pump for circulating the fluid associated with at least one of the fluid collector or delivery circuits, and wherein the control means are also suitable for controlling said circulator pump as a function of the selected mode of operation.

14. The installation of claim 13, wherein the connections between the first fluid inlet/outlet and the hot-side heat exchanger of the heat pump, and between the second fluid inlet/outlet and the cold-side heat exchanger of the heat pump are direct connections without any circulator pump.

15. The installation of claim 13, wherein the control means are also suitable, as a function of the selected mode of operation, for controlling the running or the stopping of the compressor of the heat pump.

* * * * *